United States Patent [19]
Morita

[11] Patent Number: 5,281,029
[45] Date of Patent: Jan. 25, 1994

[54] LINEAR MOTION ROLLING CONTACT GUIDE UNIT HAVING DAMPER MECHANISM

[75] Inventor: Kunihiko Morita, Koganei, Japan

[73] Assignee: Nippon Thompson Co., Ltd., Japan

[21] Appl. No.: 932,824

[22] Filed: Aug. 19, 1992

[30] Foreign Application Priority Data

Aug. 23, 1991 [JP] Japan ................. 3-237255

[51] Int. Cl.[5] .............................. F16C 29/06
[52] U.S. Cl. ........................ 384/8; 384/45; 384/99
[58] Field of Search ............... 384/8, 45, 99, 12, 44, 384/43

[56] References Cited

U.S. PATENT DOCUMENTS

| | | | |
|---|---|---|---|
| 4,643,590 | 2/1987 | Olasz | 384/8 |
| 4,872,767 | 10/1989 | Knapp | 384/99 |
| 5,145,261 | 9/1992 | Narumiya | 384/45 |
| 5,178,400 | 1/1993 | Singh | 384/99 |

*Primary Examiner*—Lenard A. Footland
*Attorney, Agent, or Firm*—Skjerven, Morrill, MacPherson, Franklin & Friel

[57] ABSTRACT

A linear motion rolling contact guide unit includes a rail having a horizontally extending wing section, a slider slidably mounted on the rail and a plurality of rollers interposed between the top surface of the rail and the slider so as to allow a shift in position in a lateral direction between the rail and the slider as the slider moves along the rail. A first slide member is fixedly attached to the slider to define a first squeeze film damper between the top surface of the rail and the first slide member. A second slide member is fixedly attached to the slider to define a second squeeze film damper between the bottom surface of the wing section and the second slide member. Each of the first and second squeeze film dampers includes an oil film for damping or absorbing any undesired vibratory motion.

7 Claims, 5 Drawing Sheets

LINEAR MOTION ROLLING CONTACT GUIDE UNIT HAVING DAMPER MECHANISM

BACKGROUND OF THE INVENTION

1. Field of the Invention

This invention generally relates to a linear motion guide unit suitable for use as a guide unit of various apparatuses such as high precision machining apparatuses and testing apparatuses, and, in particular, to such a linear motion rolling contact guide unit having an antivibration mechanism.

2. Description of the Prior Art

A linear motion rolling contact guide unit is well known in the art and it generally includes a rail, a slider slidably mounted on the rail and a plurality of rolling members interposed between the rail and the slider so as to provide a relative rolling contact therebetween.

There are a number of different types of such a linear motion rolling contact guide unit. For example, in one type, a pair of inner guide grooves is formed on the opposite sides surfaces of the rail and the slider is generally U-shaped and formed with a pair of outer guide grooves each located opposite to an associated one of the inner guide grooves to thereby define a guide channel in which the rolling members are interposed between the rail and the slider. The slider is oriented upside down and slidably mounted on the rail in a straddling manner. With this structure, since there is basically provided no play between the rail and the slider in the lateral direction orthogonal to the longitudinal axis of the rail, the slider may move along the rail linearly at high accuracy.

The above-described type of linear motion rolling contact guide unit may not be suitable in some applications, in particular where it is desired that the slider be allowed to move in the lateral or transverse direction over some distance. One typical example of such a case is an application where two rails are provided in parallel and the sliders slidably mounted on these two rails are fixedly attached to a common table. Such an example is shown in FIG. 5.

In the structure shown in FIG. 5, a pair of elongated rails A and B are fixedly mounted on a base in parallel from each other. The rail A is generally rectangular in cross sectional shape and formed with a pair of inner guide grooves at its opposite side surfaces. A slider having a generally U-shaped cross section is slidably mounted on the rail A and formed with a pair of outer guide grooves each located in an opposed relationship with an associated one of the inner guide grooves to thereby define a guide channel. A plurality of rolling members are provided in the guide channel to provide a rolling contact between the rail A and its associated slider so that these rail A, slider and rolling members together define a linear motion rolling contact guide unit. Such a guide unit may be of the finite stroke type or the infinite stroke type. That is, the slider may be formed with a pair of endless circulating paths, each including a load path section, which corresponds to the above-mentioned guide channel, a return path section and a pair of curved connecting path sections each connecting the corresponding ends of the load and return path sections. With such an endless circulating path, theoretically an infinite relative motion may be provided between the rail and the slider. Without such an endless circulating path, the stroke of a relative motion between the rail and the slider is limited to a predetermined range.

A linear motion rolling contact table assembly shown in FIG. 5 also includes the other rail B which is arranged in parallel with the rail A. However, a tolerance is normally provided in the parallel arrangement between these two rails A and B from a practical viewpoint because there is a limit in the accuracy in arranging these two rails A and B in parallel. Because of such tolerance in the parallel arrangement between the two rails A and B, use can not be made of a linear motion rolling contact guide unit having the same structure as that having the rail A as described above. For this purpose, a linear motion rolling contact guide unit having the rail B has a structure different from that of the guide unit having the rail A.

That is, as shown in FIG. 5, the rail B has a generally T-shaped cross sectional shape because of the provision of a horizontally extending wing section C. The rail B is not provided with guide grooves as different from the rail A and instead it is formed with a flat guide surface E at its top surface. A slider D is slidably mounted on the rail B and it has a generally C-shaped cross sectional shape. The slider D is provided with four roller holders G, each including an endless circulating path provided with a plurality of rollers. Two of such roller holders G are in rolling contact with the top guide surface E of the rail B and the remaining two of such roller holders G are in rolling contact with bottom guide surfaces F of the wing sections C, respectively.

As described above, since the guide surfaces E and F are provided at the top and bottom surfaces of the wing sections C of the rail B, the slider D may move in the lateral or transverse direction relative to the rail B as indicated by a double arrow I. As a result, if the range of such a relative motion in the lateral direction is selected to be slightly larger than the value of a tolerance set for the parallel arrangement between the two rails A and B, the common table fixedly attached to the two sliders associated with these rails A and B may move smoothly as guided by the rails A and B with a predetermined accuracy.

However, in the structure shown in FIG. 5, since a positive gap is provided between the rail B and the slider D, a problem arises when vibration is transmitted to the slider D externally, for example, from those elements mounted on the common table. Because of the presence of such a gap, a constant rattling motion may be produced in the slider D which in turn could cause wear, thereby deteriorating the performance. In addition, the presence of such a gap between the rail B and the slider D may cause an abrupt motion at the beginning of or ending of a relative motion between the rail B and the slider D. Thus, there is a tendency to deteriorate the accuracy in positioning of the slider D relative to the rail B.

SUMMARY OF THE INVENTION

In accordance with the present invention, there is provided a linear motion rolling contact guide unit comprising: an elongated rail having a first flat top surface and a wing section which extends horizontally from a side surface of said rail in a direction perpendicular to a longitudinal axis of said rail and which has a second flat top surface flush with said first flat top surface to thereby define a first guide surface and a flat bottom surface defining a second guide surface; a slider slidably mounted on said rail and formed with a guide groove located opposite to said first guide surface; a plurality of rolling members provided in said guide groove to thereby provide a rolling contact between said rail and said slider; a first slide member fixedly attached to said slider in an opposed relationship with said first guide surface so as to define a first squeeze film damper therebetween; and a second slide member fixedly attached to said slider in an opposed relationship with said second guide surface so as to define a second squeeze film damper therebetween.

Preferably, each of the first and second slide members is comprised of a material having a relatively low coefficient of friction. The first and second squeeze film dampers are defined by maintaining a fluid, such as oil, having a desired viscosity in the gap defined between the slide member and its associated guide surface. The slider is preferably provided with an endless circulating path including a load path section, which is defined by the guide groove and its associated portion of the first guide surface, a return path section and a pair of curved connecting path sections each connecting the corresponding ends of the load and return path sections. Preferably, the rolling members are rollers.

In one embodiment of the present invention, the second guide surface is in parallel with the first guide surface. In another embodiment, the second guide surface is inclined with respect to the first guide surface. In further embodiment, the wing section includes a flat side surface which is defined as a third guide surface and the slider is provided with a third slide member which is located in an opposed relationship with the third guide surface to thereby define a third squeeze film damper therebetween.

It is therefore a primary object of the present invention to provide an improved linear motion rolling contact guide unit having a mechanism for damping and absorbing vibration.

Another object of the present invention is to provide an improved linear motion rolling contact guide unit smooth in operation and accurate in positioning.

A further object of the present invention is to provide an improved linear motion rolling contact guide unit free of abrupt motion in relative motion between the rail and the slider especially at the time when the slider is set in motion or brought to a halt.

A still further object of the present invention is to provide an improved linear motion rolling contact guide unit suitable for use in applications carrying a relatively heavy load and/or being subjected to severe environments.

Other objects, advantages and novel features of the present invention will become apparent from the following detailed description of the invention when considered in conjunction with the accompanying drawings.

DESCRIPTION OF THE PREFERRED EMBODIMENTS

Figure 1:
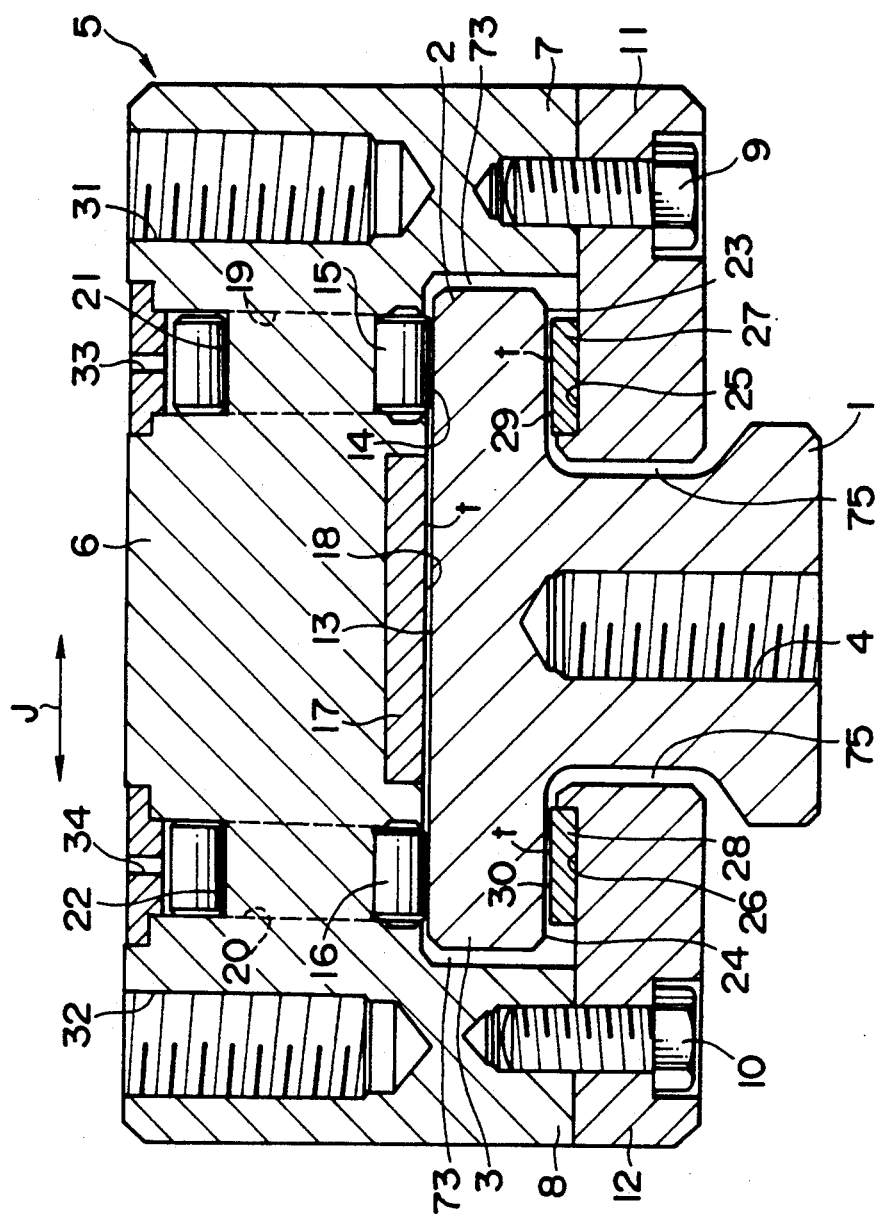
FIG. 1 is a schematic illustration showing in transverse cross section a linear motion rolling contact guide unit constructed in accordance with one embodiment of the present invention.

Referring now to FIG. 1, there is schematically shown a linear motion rolling contact guide unit constructed in accordance with one embodiment of the present invention. As shown, the present guide unit includes an elongated rail 1 which extends straight over a desired length in a direction perpendicular to the plane of the drawing. The rail 1 has a generally T-shaped cross section and thus it includes a base section which is generally rectangular in cross sectional shape and a pair of wing sections 2 and 3 which extend horizontally from the opposite side surfaces of the rail 1. The rail 1 is provided with a plurality of threaded holes 4 (only one of which is illustrated in FIG. 1) which are used for fixedly attaching the rail 1 to a desired object using bolt.

The rail 1 has a flat top surface 13 which is which is partly defined by the wing sections 2 and 2 and which is defined as a first guide surface as will be described in detail later. In this embodiment, each of the wing sections 2 and 3 is generally rectangular in cross section and thus each of the wing sections 2 and 3 has a flat bottom surface 23 and 24, respectively, each of which is defined as a second guide surface as will be described later in detail.

The present guide unit also includes a slider 5 which is slidably mounted on the rail 1 and which includes an upper horizontal section 6, extending horizontally above the rail 1, a pair of vertical side sections 7 and 8, each depending from a corresponding end of the upper horizontal section 6, and a pair of lower horizontal sections 11 and 12, each extending horizontally inwardly from the bottom end of a corresponding one of the pair of vertical side sections 7 and 8 and extending below a corresponding wing section 2 or 3. Thus, the slider 5 as a whole has a generally C-shaped cross section when rotated over 90 degrees clockwise. In the illustrated embodiment, the upper horizontal section 6 and the pair of vertical side sections 7 and 8 are integrally formed and the pair of lower horizontal sections 11 and 12 are fixedly attached to the side sections 7 and 8 by means of bolts 9 and 10, respectively. However, the slider 5 should not be limited to only such a specific structure.

The upper horizontal section 6 of the slider 5 has a flat bottom surface which is located opposite to the first guide surface 13 of the rail 1. The upper horizontal section 6 is formed with a pair of guide grooves each of which is located above a corresponding one of the wing sections 2 and 3 and receives therein a plurality of rollers 15 or 16. Each of these guide grooves, together with a portion of the first guide surface 13 of the rail 1 that is located in an opposed relationship, defines a load path section of an endless circulating path which also includes a return path section 21 or 22, which extends in parallel with the associated load path section, and a pair of curved connecting path sections 19 or 20, each connecting the corresponding ends of the load and return path sections. The rollers 15 and 16 may roll along the respective endless circulating paths endlessly so that the slider 5 may move linearly along the rail 1 as long as the rail 1 extends. Those rollers 15 and 16 which are located in the load path sections provide a rolling contact between the slider 5 and the rail 1. As is obvious from FIG. 1, these rollers 15 and 16 are arranged with their rotating axes extending in a direction perpendicular to the longitudinal axis of the guide unit. In the structure shown in FIG. 1, a seal member provided with an oil supplying hole 33 or 34 is provided in the upper horizontal section 6 at a location where the return path section 21 or 22 of a corresponding endless circulating path is provided. Thus, a lubricant may be supplied to each of the endless circulating paths to keep the rollers 15 and 16 lubricated at all times.

The bottom surface 14 of the upper horizontal section 6 is also provided with a first slide member 17 as fixedly attached thereto at a central location between the pair of endless circulating paths. The first slide member 17 is preferably comprised of a material having a relatively low coefficient of friction relative to the rail 1. Such a material is preferably selected from the group consisting of a silicone family synthetic resin, a composite material between a metal and a synthetic resin and a composite material between a metal and a chemical compound. The first slide member 17 has a bottom flat surface 18 which is to be spaced apart from the opposed first guide surface 13 of the rail 1 with a predetermined gap t. Such a gap t is preferably set on the order of several tens of microns. Then, liquid having a desired viscosity, such as oil, is supplied into this gap to thereby define an oil film is to be formed in this gap t to thereby define a squeeze film damper, which serves as a means for damping or absorbing vibration.

Each of the lower horizontal sections 11 and 12 extends toward the rail and under a corresponding one of the wing sections 2 and 3 of the rail 1. And, each of the lower horizonal sections 11 and 12 has a support surface 25 or 26 for on which a second slide member 27 or 28 is fixedly attached. The second slide member 27 or 28 has a top surface 29 which is in an opposed relationship with and spaced apart over a gap t from its associated bottom surface 23 or 24 of the wing section 2 or 3. The gap t is also set on the order of several tens of microns and the second slider members 27 and 28 are also comprised of the same material as that of the first slide member 17 set forth above. An oil film is also formed in each of these gaps to define a squeeze film damper in each of the gaps between the wing sections 2 and 3 and the second slide members 27 and 28.

As described above, the rail 1 and the slider 5 are fluid dynamically coupled through an oil film serving as a squeeze film damper at three locations. Thus, any vibratory motion imparted to the slider 5 or rail 1 may be effectively absorbed or damped at any one or more of these dampers so that the slider 5 is prevented from entering into a vibratory motion and its smooth operation is always insured. Since the squeeze film dampers are provided on the opposite sides of the wing sections 2 and 3, such an anti-vibration operation functions quite effectively. In addition, since a predetermined gap 73 is provided between a side surface of each of the wing section 2 or 3 and an opposed side surface of its corresponding side section 7 or 8 so that the slider 5 may be shifted in a direction perpendicular to the longitudinal axis of the rail 1 as indicated by a double arrow J as the slider 5 moves along the rail 1.

The slider 5 is also provided with a plurality of threaded mounting holes 31 and 32 which allow to have any desired element fixedly mounted on the slider 5.

Figure 2:
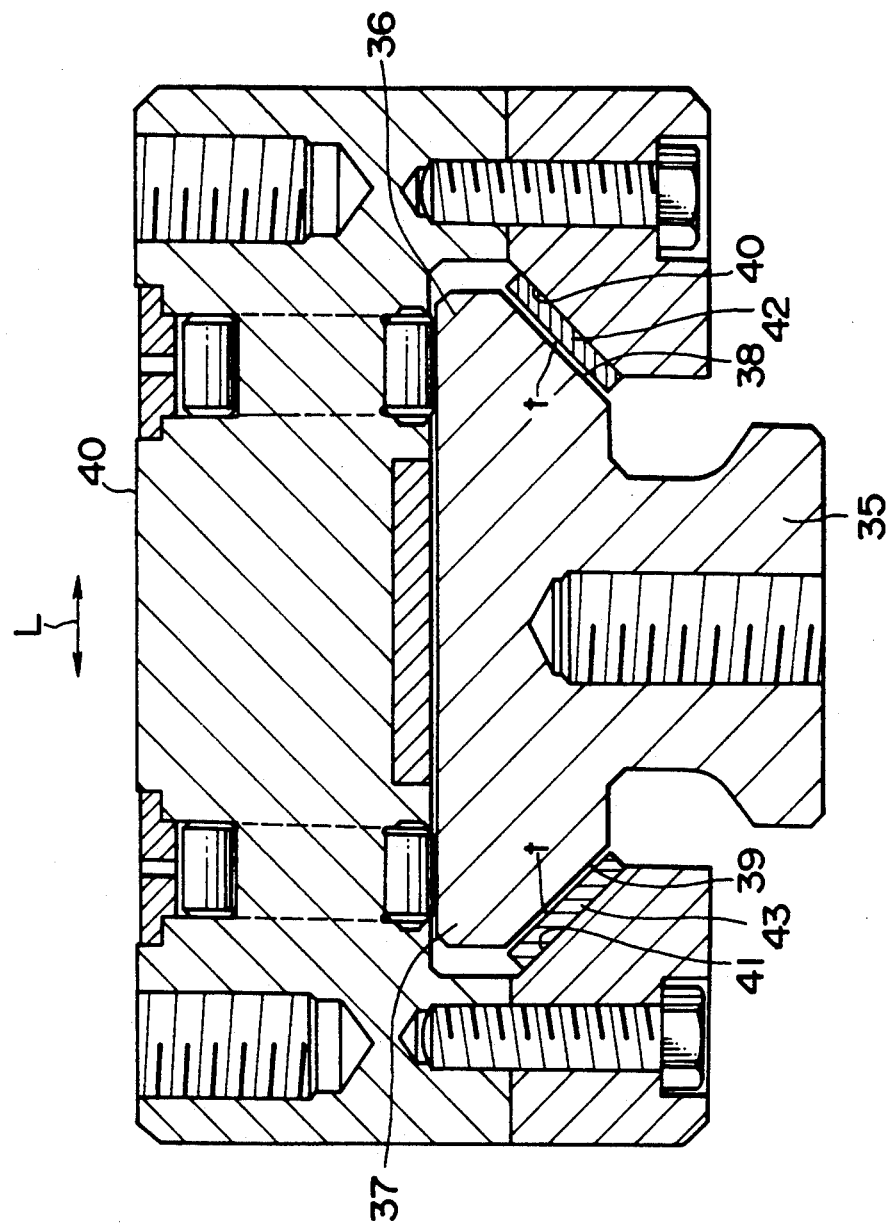
FIG. 2 is a schematic illustration showing in transverse cross section a linear motion rolling contact guide unit constructed in accordance with another embodiment of the present invention.

FIG. 2 illustrates a modification of the guide unit shown in FIG. 1. Since the embodiment shown in FIG. 2 is similar in many respects to the previous embodiment shown in FIG. 1, only those elements which are different from those in FIG. 1 are assigned with reference numerals for the sake of clarity. Thus, it should be understood that those elements shown in FIG. 2 and not assigned with reference numerals are identical to the corresponding elements shown in FIG. 1.

As shown in FIG. 2, this embodiment includes a rail 35 having a pair of wing sections 36 and 37 whose bottom surfaces 38 and 39 are inclined. As a result, a slider 40 of this embodiment includes a pair of lower horizontal sections, each of which has an inclined support surface 40 or 41 in an opposed relationship with an associated one of the inclined surfaces 38 and 39. A second slider member 42 or 43 is fixedly attached to the inclined support surface 40 or 41, so that an inclined gap t is defined between the second slide member 42 or 43 and the associated inclined surface 38 or 39 of the rail 35. The second slide members 43 and 43 are comprised of the material as set forth above and the gap t is set on the order of several tens of microns as described above. Thus, a squeeze film damper is also defined in each of these inclined gaps t. This embodiment is suitable for applications where a rather tight control in a lateral relative motion between the slider 40 and the rail 35 in a direction indicated by a double arrow L is desired.

Figure 3:
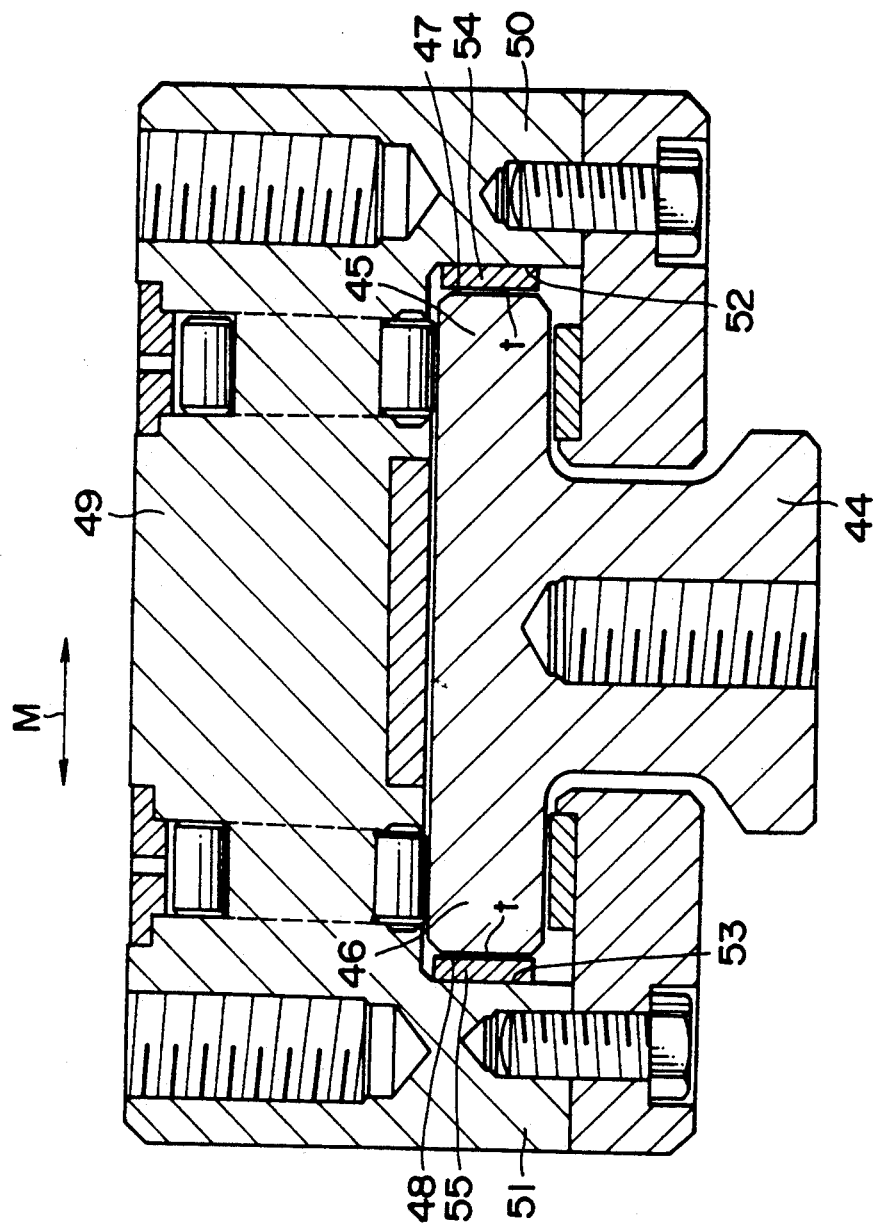
FIG. 3 is a schematic illustration showing in transverse cross section a linear motion rolling contact guide unit constructed in accordance with a further embodiment of the present invention.

FIG. 3 shows another embodiment of the present invention which is also very similar in many respects to the embodiment shown in FIG. 1 and the only difference exists in the provision of a pair of third slide members 54 and 55. That is, as shown in FIG. 3, a rail 44 is basically the same in structure as the rail 1 in FIG. 1 and it includes a pair of wing sections 45 and 46 extending horizontally in the opposite directions which are also similar to the wing sections 2 and 3 of the embodiment shown in FIG. 1. However, in the present embodiment, each of the wing sections 45 and 46 has a side guide surface 47 or 48, and a third slide member 54 and 55 is fixedly attached to an associated side surface 52 or 53 or a corresponding one of vertical side sections 50 and 51 which depend from respective sides of an upper horizontal section 49. Thus, a predetermined gap t is defined between the third guide surface 47 or 48 and the surface of associated third slide member 54 or 55. The gap t of this embodiment is also set on the order of several tens of microns and a squeeze film damper is also defined in each of these gaps t as described before.

The embodiment shown in FIG. 3 also allows a relative lateral shift in position between the slider and the rail 44 as indicated by a double arrow M in a manner similar to that of the embodiment shown in FIG. 1. However, in the present embodiment, since the third slide members 54 and 55 are provided opposite to the associated side surfaces 47 and 48 of the wing sections 45 and 46, such a lateral shift may be limited to a predetermined range. Moreover, this embodiment is also effective in absorbing or damping any vibratory motion having an amplitude oscillating in the horizontal direction. Therefore, the present embodiment is more effective in absorbing or damping undesired oscillatory motion.

Figure 4:
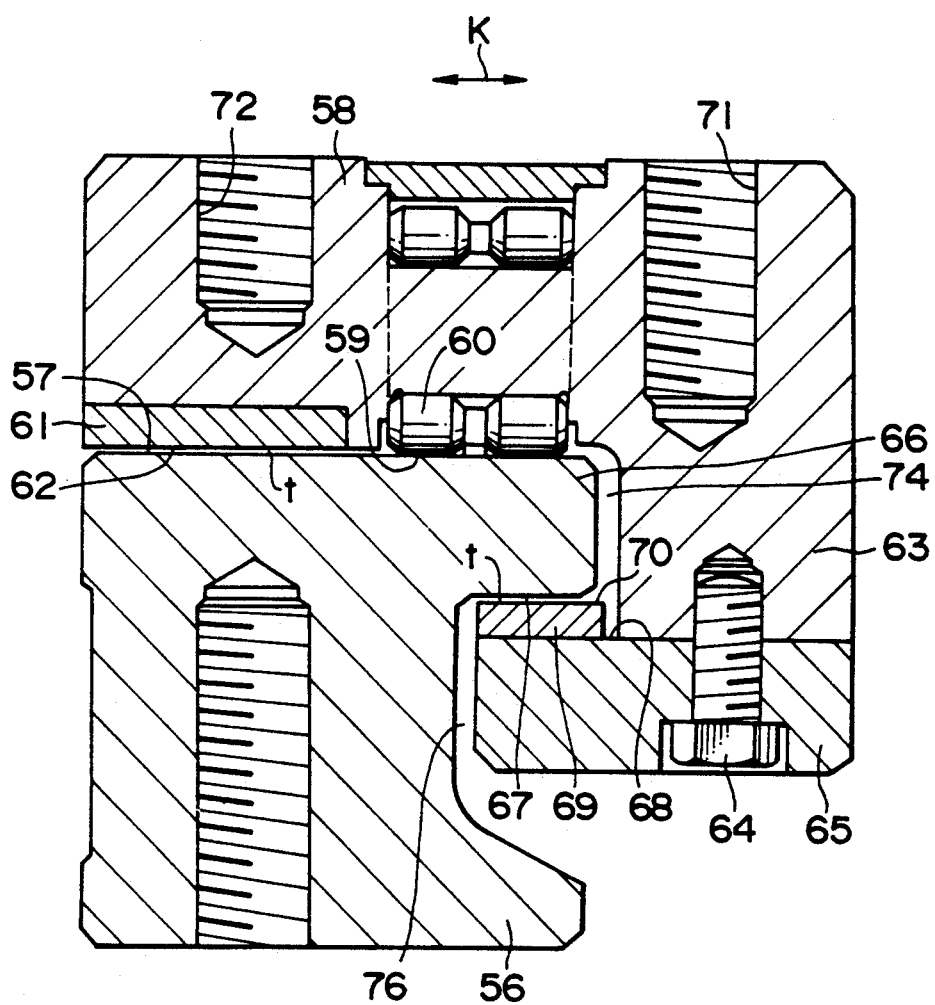
FIG. 4 is a schematic illustration showing in transverse cross section a linear motion rolling contact guide unit constructed in accordance with a still further embodiment of the present invention.
Figure 5:
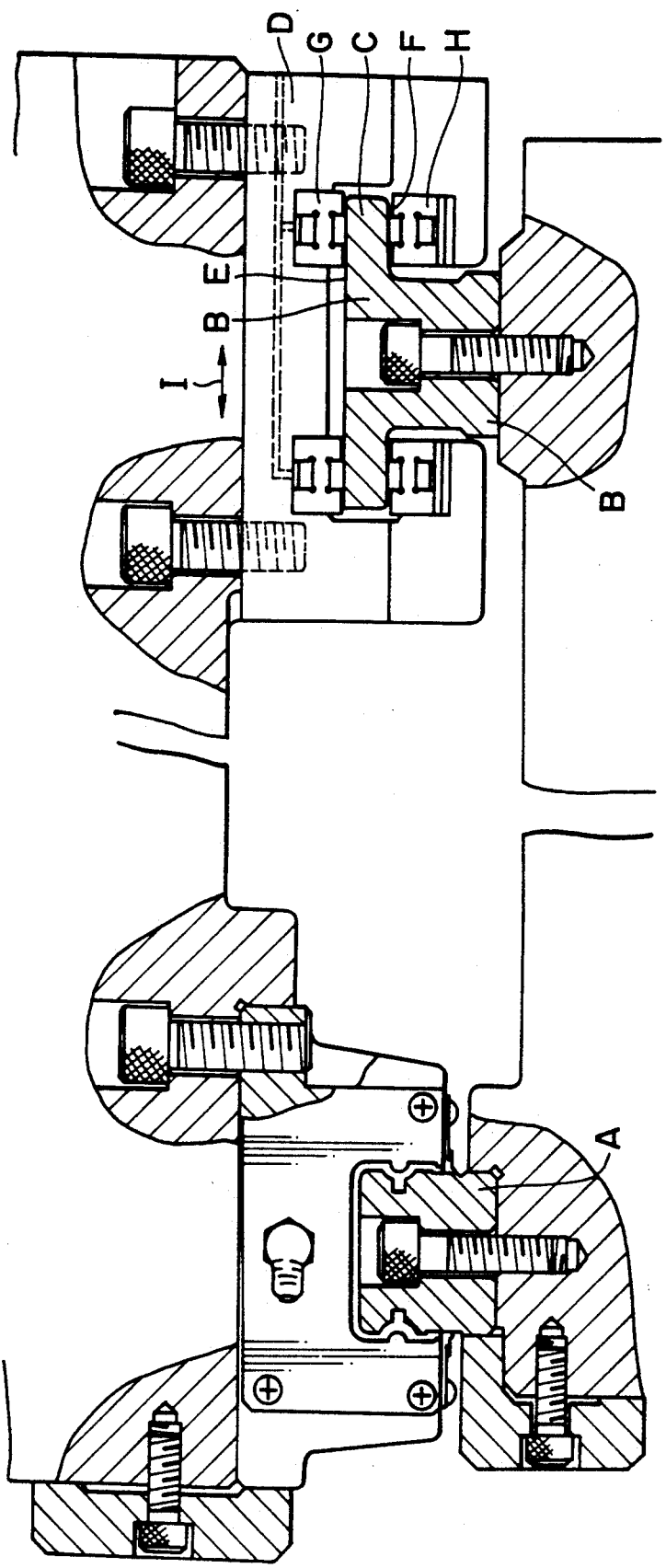
FIG. 5 is a schematic illustration showing partly in transverse cross section a typical prior art linear motion rolling contact table assembly including a pair of parallel guide rails spaced apart from each other.

FIG. 4 illustrates a still further embodiment of the present invention, which basically corresponds to a right-hand half of the structure shown in FIG. 1. That is, the present guide unit includes a rail 56 having a single wing section 66 which extends horizontally to the right in the figure. The rail 56 also has a flat top surface 57 which defines a first guide surface. The wing section 66 has a flat bottom surface 67 which defines a second guide surface. The present guide unit also includes a slider including an upper horizontal section 58, a vertical side section 63 and a lower horizontal section 65. In the illustrated embodiment, the upper horizontal section 58 and the vertical side section 63 are integrally formed and the lower horizontal section 65 is fixedly attached to the vertical side section 3 at its bottom end surface by means of a bolt 64.

The upper horizontal section 58 is provided with an endless circulating path in which a plurality of rollers 60 are provided. As described previously, the endless circulating path includes a load path section, a return path section and a pair of curved connecting path sections each connecting the corresponding ends of the load and return path sections. The load path section is a section which is provided in the bottom guide surface 59 of the upper horizontal section 58 and in which the rollers 60 provide a rolling contact between the slider and the first guide surface 58 of the rail 56. The bottom guide surface 59 is also provided as fixedly attached thereto a first slide member 61 which has a bottom guide surface 62 opposite to and spaced apart over a gap t from the first guide surface 57 of the rail 56. As described before, the gap t is set on the order of several tens of microns and a first squeeze film damper is defined in this gap t.

On the other hand, the lower horizontal section 65 has a support surface 68 on which a second slide member 69 is fixedly mounted. The second slider member 69 has a top guide surface 70 in an opposed relationship with and spaced apart over a gap t from the second guide surface 67 of the wing section 66. The gap t is also on the order of several tens of microns and a second squeeze film damper is defined in this gap. It is to be noted that these first and second slide members 61 and 69 may be comprised of the same material as set forth before with respect to the previous embodiments. The slider is also provided with a plurality of threaded mounting holes 71 and 72 extending from the top surface so that any desired object may be fixedly attached to the top surface of the slider.

Of importance, in the structure shown in FIG. 4, similarly with the structure shown in FIG. 1, a first lateral gap 74 is provided between the wing section 66 and the vertical side section 63 and a second lateral gap 76 is provided between the rail 56 and the lower horizontal section 65. As a result, the slider may shift in position laterally relative to the rail 56 as indicated by a double arrow K as it moves along the rail 56 in the longitudinal direction. These first and second lateral gaps 74 and 76 correspond to lateral gaps 73 and 75 in the structure shown in FIG. 1. Such a structure is advantageous because it allows to provide a certain tolerance in alignment of rail 56.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact guide unit, comprising:
    an elongated rail having a first flat top surface and a wing section which extends horizontally from a side surface of said rail in a direction perpendicular to a longitudinal axis of said rail and which has a second flat top surface flush with said first flat top surface to thereby define a first guide surface and a flat bottom surface defining a second guide surface;
    a slider slidably mounted on said rail and formed with a guide groove located opposite to said first guide surface;
    a plurality of rolling members provided in said guide groove to thereby provide a rolling contact between said rail and said slider;
    a first slider member fixedly attached to said slider in an opposed relationship with said first guide surface so as to define a first squeeze film damper therebetween; and
    a second slide member fixedly attached to said slider in an opposed relationship with said second guide surface so as to define a second squeeze film damper therebetween.

2. The guide unit of claim 1, wherein said first guide surface is horizontal and said second guide surface is also horizontal.

3. The guide unit of claim 1, wherein said first guide surface is horizontal and said second guide surface is inclined with respect to the horizontal first guide surface.

4. The guide unit of claim 1, wherein each of said first and second slide members is comprised of a material having a low coefficient of friction relative to said rail.

5. The guide unit of claim 4, wherein each of said first and second squeeze film damper has a thickness on the order of several tens of microns.

6. The guide unit of claim 5, wherein said slider is provided with an endless circulating path including a load path section, a return path section and a pair of curved connecting path sections each connecting the corresponding ends of the load and return path sections, said load path section being defined by said guide groove and that portion of said first guide surface that is located opposite to said guide groove.

7. The guide unit of claim 1, wherein said wing section has an side surface defined as a third guide surface, and said unit further comprising a third slide member fixedly attached to said slider in an opposed relationship with said third guide surface so as to define a third squeeze film damper therebetween.

* * * * *